United States Patent
Larsson (10) Patent No.: US 7,047,655 B2
(45) Date of Patent: May 23, 2006

(54) SNAP LOCKING ANGLE ADJUSTABLE DEVICE, IN PARTICULAR A CARPENTER'S SQUARE

(75) Inventor: Svante Larsson, Umeå (SE)

(73) Assignee: Plano System AB, Umea (SE)

( * ) Notice: Subject to any disclaimer, the term of this patent is extended or adjusted under 35 U.S.C. 154(b) by 0 days.

(21) Appl. No.: 10/735,851

(22) Filed: Dec. 16, 2003

(65) Prior Publication Data

US 2004/0172841 A1 Sep. 9, 2004

(30) Foreign Application Priority Data

Dec. 16, 2002 (SE) .................................. 0230705-9

(51) Int. Cl.
  *B43L 7/10* (2006.01)
(52) U.S. Cl. ............................. 33/471; 33/455; 33/495; 403/87
(58) Field of Classification Search .................. 33/471, 33/495–500, 455, 465, 452, 468, 469, 483; 403/83, 84, 85, 87, 93, 94, 96; 248/292.12, 248/292.13, 289.11, 291.1, 299.1
See application file for complete search history.

(56) References Cited

U.S. PATENT DOCUMENTS

| 304,196 | A | | 8/1884 | Hill |
| 306,418 | A | | 10/1884 | Muller |
| 311,911 | A | | 2/1885 | Muller |
| 342,849 | A | | 6/1886 | Seltzer |
| 745,243 | A | * | 11/1903 | Saxton et al. .................. 403/93 |
| 955,314 | A | * | 4/1910 | Borne .......................... 403/96 |
| 986,239 | A | | 3/1911 | Stoddard |
| 1,638,200 | A | | 8/1927 | Hester |
| 2,584,451 | A | * | 2/1952 | Hopp .......................... 403/102 |
| 2,689,406 | A | * | 9/1954 | Stromquist .................... 33/495 |
| 2,775,037 | A | | 12/1956 | Baumunk |
| 2,942,634 | A | | 6/1960 | Gathercoal |
| 3,317,225 | A | * | 5/1967 | Cooper ......................... 403/24 |
| 4,097,999 | A | * | 7/1978 | Nowlin ......................... 33/500 |
| 4,312,133 | A | | 1/1982 | Mima |
| 4,348,815 | A | | 9/1982 | Hurt |
| 4,387,650 | A | * | 6/1983 | Pizzi ........................... 108/40 |
| 4,394,801 | A | * | 7/1983 | Thibodeaux ................... 33/496 |
| 4,446,627 | A | * | 5/1984 | Persson ........................ 33/497 |
| 4,917,343 | A | * | 4/1990 | Wainscott ................ 248/447.2 |
| 4,920,658 | A | * | 5/1990 | Hile ............................ 33/499 |
| 5,020,233 | A | | 6/1991 | Syken |

(Continued)

FOREIGN PATENT DOCUMENTS

FR 761096 1/1934

(Continued)

*Primary Examiner*—R. Alexander Smith
(74) *Attorney, Agent, or Firm*—Nixon & Vanderhye P.C.

(57) ABSTRACT

The invention is a snap locking angle adjustable device, particularly applicable to carpenter's squares. Carpenter's squares, being used in rough environment, must be simple to adjust while providing robust snap locking at high angle precision. Prior art attains this by protruding steel balls, attached around the pivot axis of the square's handle, pressed strongly against a hole punched area around the pivot axis of the square's blade-balls aligns to holes gives the snap locking. The problem is to simplify manufacturing. The invention comprises components with moulded alignment structures. These components are the complete pivot members (handle or blade) themselves, or are separately attached to the pivot members. The components, and optionally, are sandwiched, alignment structures against each other, and axially pressed together strongly by a spring held in compression by a press frame that also may constitute a pivot shaft for the pivot members.

39 Claims, 5 Drawing Sheets

U.S. PATENT DOCUMENTS

| | | | | |
|---|---|---|---|---|
| 5,190,390 | A | * | 3/1993 | Ming-Tai ..................... 403/24 |
| 5,228,535 | A | * | 7/1993 | McCarty ..................... 182/163 |
| 5,547,305 | A | * | 8/1996 | Treche ......................... 403/97 |
| 5,687,628 | A | * | 11/1997 | Liao ............................. 83/745 |
| 5,839,201 | A | | 11/1998 | Young |
| 5,961,220 | A | * | 10/1999 | Som et al. .................. 384/416 |
| 6,141,882 | A | | 11/2000 | Syken |
| 6,237,238 | B1 | * | 5/2001 | Shapiro ....................... 33/471 |
| 6,330,752 | B1 | * | 12/2001 | Ellam .......................... 33/471 |
| 6,629,801 | B1 | * | 10/2003 | Cheng ........................ 403/101 |
| 6,804,895 | B1 | * | 10/2004 | Shapiro ....................... 33/471 |
| 2004/0179891 | A1 | * | 9/2004 | Watkins et al. ............... 403/96 |

FOREIGN PATENT DOCUMENTS

SE        451443        3/1983

* cited by examiner

SNAP LOCKING ANGLE ADJUSTABLE DEVICE, IN PARTICULAR A CARPENTER'S SQUARE

This application claims priority to Sweden Application No. 0203705-9, filed 16 Dec. 2002. The entire contents of this application are incorporated herein by reference.

BACKGROUND OF THE INVENTION

1. Technical Field

The invention is a snap locking angle adjustable device, particularly applicable to adjustable carpenter's squares—squares in which the angle between the blade (or tongue) and the handle (or stock) is adjustable to a number of predetermined positions. An equivalent name is adjustable builder's square. The field of use is in particular construction work such as building houses. The invention may also be categorized as a foldable square: a square having a blade that may be folded into the handle, for example to facilitate putting the square into a pocket. In a wider sense, the invention is a snap locking angle adjustable device, which may be: a component of or a complete carpenter's square, or: a component in a mitre saw or other tool that, from time to time, is being adjusted to predetermined angles.

2. Technical Problem Solved by the Invention

The invention solves problem with critical manufacturing steps for angle adjustable carpenter's squares. This specifically applies to the product "Quattro" from Nobex AB and the square documented in SE-451,443. As part of the manufacturing, four steel balls are pressed into four holes of an aluminum profile that is to become the handle of the square. Another process step is to punch 8 holes into a steel sheet that is to become the blade of the square. The holes' diameters and positions and the steel balls' settling positions, are critical parameters that determine the angle precision of the square. In other words, the angle precision depends both on processing (hole punching) the handle and the blade and on mounting several parts (steel balls) into precise positions. That is one aspect of the problem; the following is another aspect. In the case of the blade having eight holes, the blade locks into position at angles spaced with 45° interval. In order to obtain a 22.5° spacing, 16 holes would be needed. However, compared to holes, this would yield much thinner metal bridges between neighbouring holes—much thinner, because the holes are positioned in a row along a circle with a radius that can not be much larger than 15 mm, and because the holes have a certain feasible minimum diameter—thus causing difficulties to fabricate the square with maintained angle precision.

3. Description of Related Art

The product "Quattro" from Nobex AB and the square documented in SE-451,443 are examples of adjustable carpenter's squares. Snap locking is achieved by the following means. The square's blade has a number of holes concentrically placed around the (blade's and the handle's common) pivot axis. Similarly, the square's handle has a number of steel balls concentrically placed around the pivot axis; the steel balls protrude in axial direction above a plane normal to the pivot axis. A strong metal spring presses the blade against the handle in the axial direction. At certain angles between the handle and the blade, the steel balls align with the holes, causing the blade and the handle to snap lock.

A measuring instrument is described in U.S. Pat. No. 5,020,233. The member arms (corresponding to the blade and the handle of a carpenter's square) are formed in plastics or other stiff but elastically distortable material. The member arms are attached to each other such that a tension is created in the elastic material, thus giving rise to a spring force—analogous to the force created by the metal spring of the carpenter's squares above—that presses the member arms axially against each other. Detents and protrusions in the material, concentrically around the pivot axis, of each member arm—analogous to the steel balls and holes—are responsible for a snap locking function.

There are also adjustable squares having other locking mechanisms. First, there are a number of squares characterized by radial alignment structures (not axial, as the steel balls and the other alignment structures above). The following patents describe such squares:

FR-761,096
U.S. Pat. No. 5,839,201
U.S. Pat. No. 6,141,882
U.S. Pat. No. 304,196

Second, there are a number of adjustable squares characterized by axial alignment structures—same as the previously described carpenter's squares and the measuring device—however not snap locking: a wing nut a thumb nut, a pull handle, etcetera needs to be manipulated before the angle can be changed. These prior art squares are characterized by the following patents:

U.S. Pat. No. 2,942,634
U.S. Pat. No. 342,849
U.S. Pat. No. 1,638,200
U.S. Pat. No. 2,775,037
U.S. Pat. No. 4,348,815
U.S. Pat. No. 4,312,133
U.S. Pat. No. 311,911
U.S. Pat. No. 306,418
U.S. Pat. No. 986,239

DRAWINGS—NAME OF PARTS

1—Contacting element (fixed to (101)).
11—Alignment structure (aligns with (21)).
12—Joining structure such as a pin.
12'—Joining structure such as a hole.
13—Hole for shaft.
14—Alignment and securing structure such as a sleeve.
2—Contacting element (fixed to (102)).
21—Alignment structure (aligns with (11)).
22—Joining structure such as a ridge.
22'—Joining structure such as a groove.
23—Hole for shaft.
24—Alignment and securing structure such as a sleeve groove.
3—Contacting element (fixed to (101)).
31—Alignment structure (aligns with (41)).
33—Hole for shaft.
4—Contacting element (fixed to (102)).
41—Alignment structure (aligns with (31)).

42—Joining structure (prevents relative rotation between the joined components).
42'—Joining structure (prevents relative rotation between the joined components).
43—Hole for shaft.
5—Spring (elastic device).
6—Press frame or "spring expansion-restricting device".
61—Connecting structure (such as standard or column) that rigidly connects (62) and (63).
62—Position-limiting member (such as a head, a beam, or a plate).
63—Position-limiting member (such as a head, a beam, or a plate).
64—Screw threads, external.
64'—Screw threads, internal.
101—Pivot member such as blade or tongue.
102—Pivot member such as handle or stock.
102a—Upper face of stock or handle.
102b—Lower face of stock or handle.
102c—Left edge of stock or handle.
102d—Right edge of stock or handle.
A—Pivot axis.
S—Displacement line.

Drawings—Measurements h12—Distance between (1) and (2).
h34—Distance between (3) and (4).
φ—Angle between the pivot members.
F—Spring force.

DETAILED DESCRIPTION OF PREFERRED EMBODIMENTS

Disclosure of Invention—Advantages Provided by the Invention

The technical effects, or technical advantages, that the invention provides over the described prior art, are as follows.

Primarily, a square suitable as a carpenter's square or a builder's square is attained. In particular this means a square that is easy to handle with gloves in rough environment and weather conditions—no fine finger adjustments are needed: angle setting is achieved simply by pulling the blade and the handle apart (or. pushing them together) until they snap lock automatically, and stays firmly, at precise angles. This should be contrasted with the lists of patents in "other adjustable squares" above, which all, except for FR-761,096, are not this easy to adjust and do not have a snap locking function. The invention provides firm (not yielding easily; stable; secure) angle settings because of the large spring force that is feasible. In contrast, the square in U.S. Pat. No. 5,020,233 cannot possibly have that firm angle settings, because its weak spring force. Also SE-451,443 has disadvantages in this respect because the spring force acts to press the ("opposing walls" 12 and 13 of the) handle apart.

In addition, the manufacturing process is simplified compared to the product "Quattro" and the square in SE-451,443. In particular, the process steps of punching holes and attaching steel balls are eliminated. Additionally, because the handle itself does not need to be subjected to a spring force, the handle can be simplified compared with SE-451,443.

Furthermore, a densely-spaced angle snap-locking becomes easy to implement. For example, to decrease the spacing much below 45° would not be straightforward for squares such as "Quattro" and SE-451,443. Also in the case of FR-761,096, fabrication becomes increasingly difficult when the spacing decrease below 45° under the constraint of high angle precision. The invention, however, makes it easy to fabricate high precision carpenter's squares with 22.5° and even smaller spacing.

Disclosure of Invention—Embodiments

First Embodiment

Figure 1:
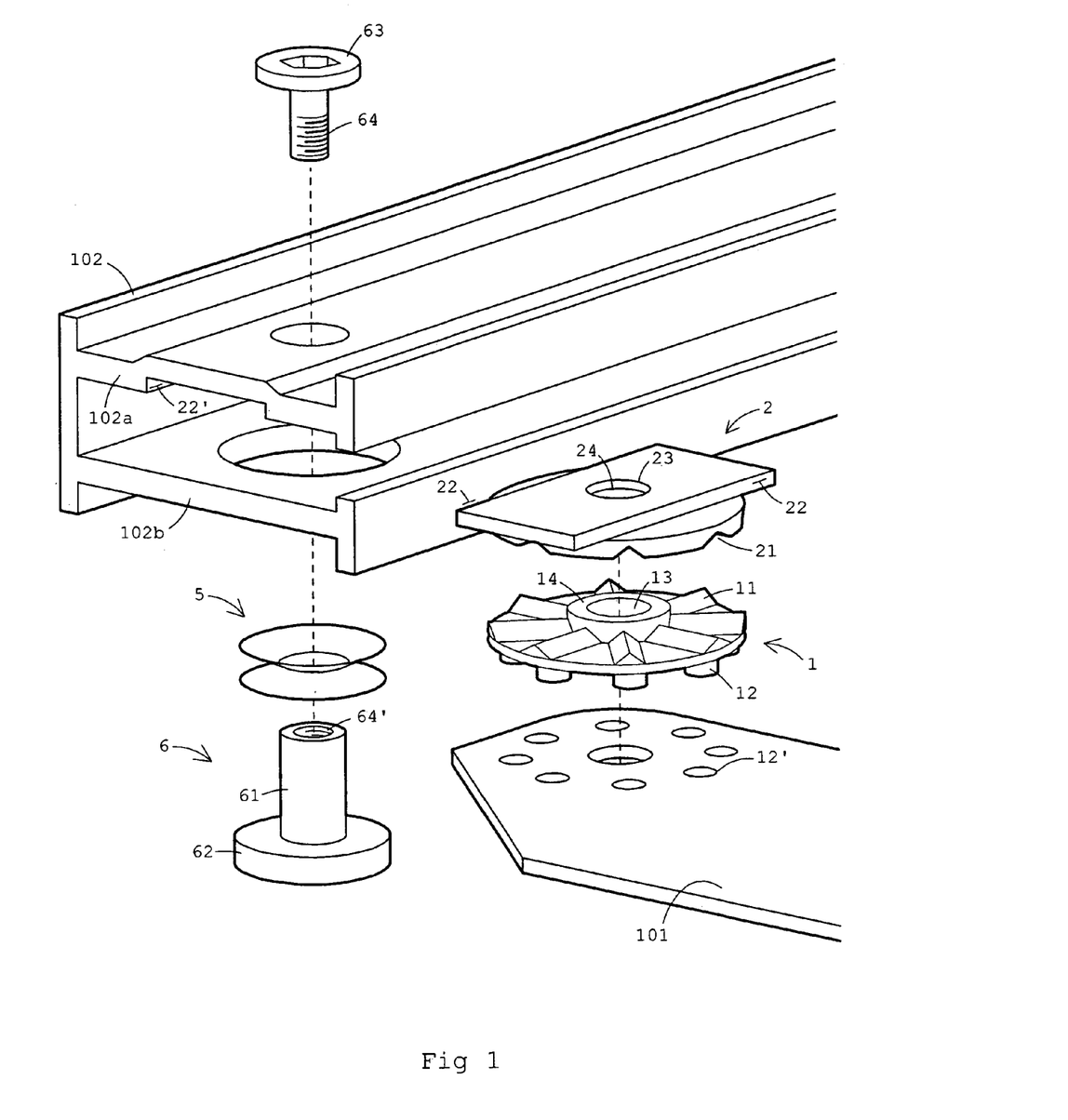
FIG. 1 illustrates an explored view of a first embodiment of the present invention.
Figure 2:
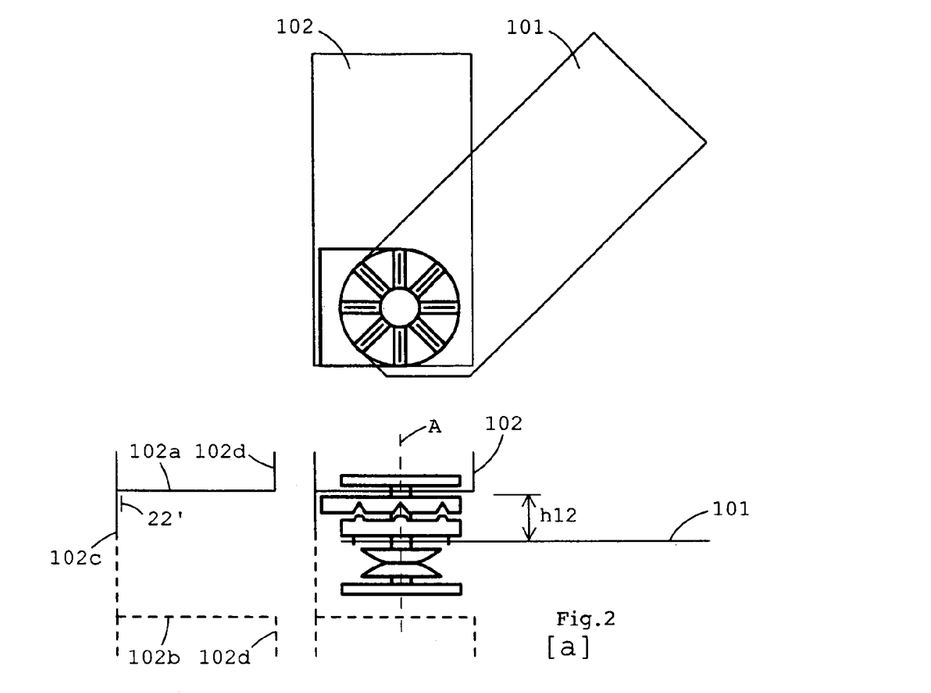
FIGS. 2a and 2b are schematic views showing components of the embodiment of FIG. 1.

An embodiment of the invention is illustrated by an exploded view in FIG. 1 and by a schematic drawing in FIGS. 2a and 2b. Consider first the plate (1) in FIG. 1: the plate has ridges (11) on its upper face and pins (12) on its lower face. Assembled, the pins (12) fit tightly in the holes (12'), thus securing the plate (1) to the blade (101). Next, consider the plate (2): this plate has grooves (21) on its bottom face and a rectangular body with edges (22) on its upper face. Assembled, the rectangular body with the edges (22) fits tightly in the channel with the walls (22'), thus securing the plate (2) to the handle (102). Now, the plate (2) may put on top of the plate (1) in a manner such that the ridges (11) mate with the grooves (21). Assembled, the elements (5, 101, 1, 2, 102a) forms a sandwich squeezed between the heads (62) and (63). This is schematically shown in FIG. 2a. The upper screw (63, 64) and the lower, internal threaded, screw (61, 62, 64') are tightened together; and the two Belleville spring washers (5), are compressed.

Second and Third Embodiments

Two other embodiments are illustrated in FIGS. 3a and 3b. First, as a matter of notation, the graphic symbols for the elements (5), (1), (2), (62), and (63) are the same as in FIG. 2b. Now, the embodiment shown in FIG. 3a is characterized in that the components (102b, 5, 101, 1, 2, 102a) forms a sandwich squeezed between the heads (62) and (63). Notice further that, because the spring washers rest upon the lower face (102b) of the handle, the hole in (102b) can be fabricated smaller than the corresponding hole in FIG. 1. As a result, the holes in (102a) and (102b) may be punched to the same small size. Notice also that the components may be assembled differently compared to the square in FIG. 1: the handle (an aluminum profile in this case) may need to be separated slightly (indicated by the left drawing) before inserting the components (5, 101, 1, 2).

Next, the embodiment shown in FIG. 3b, on the other hand, is characterized by the following. Only the components (5, 101, 1, 2) are squeezed between the heads (62) and (63)—it is true that the upper and the lower face (102a, 102b) serves as axial stops, but the handle may still be allowed to have some free axial movement with respect to (62, 63). Notice as well that assembly involves placing the plate (2) on top of the upper face (102a) of the handle. Also shown is an alternative means of securing the plate (2) with respect to rotation relative to the handle (102). Specifically, the form and positions of the elements (22) and (22') differ from the first example shown in FIG. 1.

Fourth Embodiment

A fourth embodiment is described by means of the schematic drawings in FIGS. 4a–4c and FIGS. 5b and 5b. As a matter of notation: the graphic symbols for the elements (5), (62), and (63) are the same as in FIG. 2b. Now in this example illustrated by FIGS. 4a, 4b, 4c, 5b, the addition of the elements (3) and (4) is the main difference to the previous three examples. To understand the function of the whole device, notice that the plates (2) and (4) follows the handle's rotation, while the plate (1, 3) follows the blade's rotation around the pivot axis (A). Also understand that the sandwich (5, 4, 3, 101, 1, 2, 102a) is squeezed between the heads (62) and (63). Therefore, and due to the surface structures (21, 11, 31, 41), the amount of compression experienced by the spring washers (5) will vary with the rotational angle between the handle and the blade. This is qualitatively illustrated in FIG. 5b. The dependence of the spring force (F) on the angle ($\phi$), may be compared with the correspondent dependence for the other embodiments, shown in FIG. 5a: notice that a difference exists only at the angles $\phi=0°$ and $\phi=180°$. For the square in FIG. 4, when the spring force (F) is zero (which occurs at $\phi=0°$ and $\phi=180°$) the blade ay be moved along the line (S) of the handle. At other angles, that is $0°<\phi<180°$, the blade and the handle are locked to each other with respect to displacements along (S); but the blade can be rotated relative to the handle, and snap locking occurs at certain angles, as for previous example forms.

Irrespective of any of the examples so far described, the element (6), can be a screw (63, 64) secured to an internal threaded bolt (61, 62, 64') as in FIG. 1. Alternatively, the column (61) and the two press heads, or press beams, (62) and (63) may also simply include a rivet (not shown in a drawing). A screw arrangement though, enables the spring force to be adjustable.

The sleeve (14) and the sleeve groove (24) indicated in FIG. 1, serve to secure and align the pivoting elements (101, 1, 2, 102) on the pivot axis. This arrangement is of course applicable to any of the above-described example forms (not only the form shown in FIG. 1). Alternatively, the column (61) alone may be responsible for aligning and securing the pivoting elements on the pivot axis.

Disclosure of Invention—General Description

The elements (1) and (2) serve as contacting elements (sliding on, and snap locking to, each other); and to indicate this we use the term "contacting elements" in the present general description—they may be plates, as in the examples, but they may also have other forms. The elements (3) and (4), in case of their presence, have also this function and are therefore also called contacting elements—they may be formed as plates but they can have other forms as well. Preferred characteristics of the contacting elements (2, 1, 3, 4) are as follows. Each contacting element has one face containing an "alignment structure": a pattern of surface detents and protrusions, such as (11) and (21) in FIG. 1, aimed at aligning the contacting element to a complementary contacting element—(1) aligns with (2), and (3) aligns with (4). Basically, the alignment structures are means for achieving a variation of the distance (h12) and the distance (h34) with a variation of the contacting elements' rotational angle around the pivot axis. This can be achieved by radial ridges and grooves, as for example the ridges (11) and the grooves (21) in FIG. 1. But this may be achieved by other alignment structures as well; the preferred arrangements are as follows. First, the alignment structures have a periodic recurring pattern along concentric circles centered at the pivot axis (A). Second, the structural pattern of the element (1) should be complementary to the structural pattern of the element (2), meaning that all ridges (or humps) on one element should fit into all or some grooves (or dents) on the other element. Similarly for the elements (3) and (4). Except for the alignment structures, the contacting elements have the following preferred characteristics. The contacting elements (1) and (3) should be fixedly connected to the element (101) with respect to rotations around the pivot axis (A). Similarly, the contacting elements (2) and (4) should be fixedly connected to the element (102) with respect to rotations around the pivot axis (A).

The elements (101) and (102) may be the blade and the handle of a carpenter's square, but in principle they can be any two separate but pivotly connected parts.

The fixed connection of each contacting element to respective pivot member (101, 102), may be achieved by the following structure. The first pivot member (101) and the contacting element (1) may be parts of one single plastic component that has been attained by plastic injection moulding or other moulding technique. The second pivot member (102) and the contacting element (2) may also, with the exception stated below, be parts of one single component that has been attained by plastic injection moulding or other moulding technique. In any case, they may also be separate components: the pivot member is then fixedly connected to the contacting element (or elements) via pins, holes, ridges, or grooves such as (12, 12', 22, 22') or any other known structure, etc. that prevents relative rotation. For devices comprising the pivot members and four contacting elements (2, 1, 3, 4)—which in addition to a pivoting capability around the axis (A) also have a displacement capability along the line (S)—the second pivot member and its contacting elements (102, 2, 4) should not be one single component.

Figure 3:
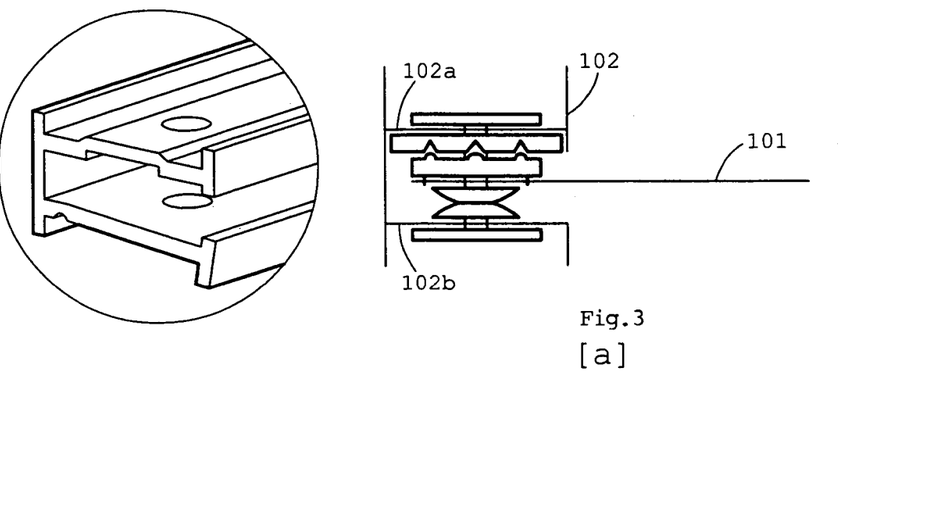
FIGS. 3a and 3b illustrate second and third embodiments of the present invention.
Figure 4:
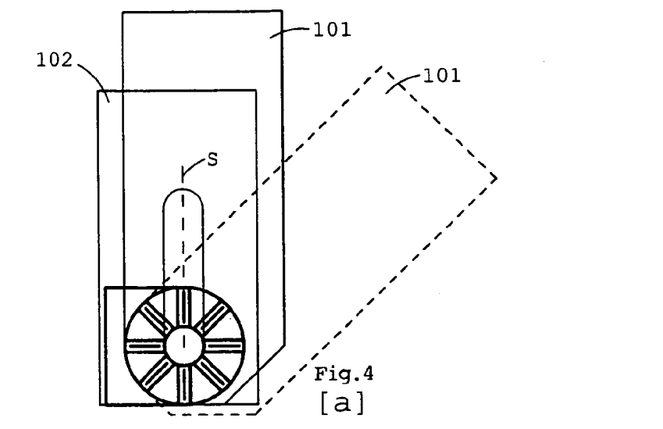
FIGS. 4a–4c illustrate yet another embodiment of the present invention.
Figure 5:
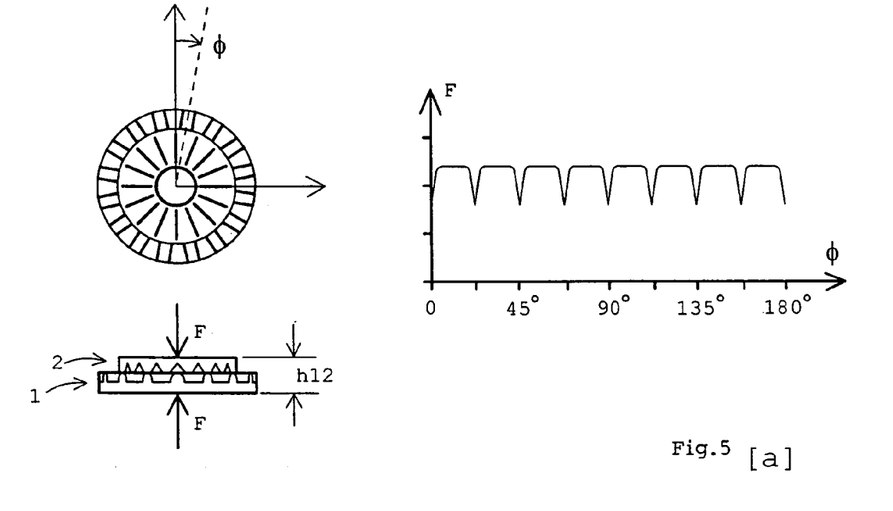
FIGS. 5a and 5b illustrate charts plotting angular dependence of the spring force.

The spring (5) and the press frame, or the spring expansion-restricting device, (6), cooperates to press the contacting elements together. Observe that the elements (61, 62, 63) are specifically purposed to restrict the spring from expanding. For a carpenter's square such as the ones in FIGS. 1, 3, the stock (102) and the element (6) would be separate components. For other embodiments, the stock elements (102c, 102b, 102a) themselves could serve as the elements (61, 62, 63) of the press frame (6), and no separate components would be needed.

The invention claimed is:

1. A carpenter's square comprising:
a blade and a handle, rotatable relative to each other around a pivot axis; and
a snap locking angle adjustable device including:
a first contacting element having a first alignment structure that rotates rigidly with the blade around the pivot axis;
a second contacting element having complementary first alignment structure that rotates rigidly with the handle around the pivot axis; and
a spring that, in conjunction with a spring expansion-restricting device, presses the first alignment structure axially against the complementary first alignment structure; wherein:
the first alignment structure and the complementary first alignment structure align at certain angles between the blade and the handle, at which the spring force is reduced compared to at angles where they do not align;
the spring expansion-restricting device comprises position-limiting members, in between which the spring and the contacting elements are placed, rigidly held together by connecting structure, and
each one of the contacting elements with its alignment structure is a single unit formed by a moulding technique.

2. The carpenter's square according to claim 1, wherein the first pivot member and the first contacting element are separate components joined to each other by structure that rigidly connects these components with respect to rotations around the pivot axis.

3. The carpenter's square according to claim 1, wherein the second pivot member and the second contacting element are separate components joined to each other by structure that rigidly connects these components with respect to rotations around the pivot axis.

4. The carpenter's square according to claim 3, further comprising a third contacting element having a third alignment structure that rotates rigidly with the first pivot member around the pivot axis; and a fourth contacting element having complementary third alignment structure that rotates rigidly with the second pivot member around the pivot axis, wherein
   the spring, in conjunction with the spring expansion-restricting device, presses the third alignment structure axially against the complementary third alignment structure, and
   the third alignment structure and the complementary third alignment structure align at certain angles between the pivot members, at which the spring force is reduced compared to at angles where they do not align.

5. The carpenter's square according to claim 1, wherein the distance between the position-limiting members can be changed by an axial screw coupling of the connecting structure, allowing for adjustment of the spring force.

6. The carpenter's square according to claim 1, wherein the combination of a sleeve on one of the first contacting element or the second contacting element and a sleeve groove on the other of the first contacting element or the second contacting element, aligns and secures the first and second contacting elements and the pivot members on the pivot axis.

7. The carpenter's square according to claim 1, wherein the spring is positioned between the blade and the handle.

8. The carpenter's square according to claim 1, wherein the handle and the blade align at 45° intervals.

9. The carpenter's square according to claim 1, wherein the handle and the blade align at 22.5° intervals.

10. The carpenter's square according to claim 1, wherein the handle has an upper face and a lower face defining a space therebetween.

11. The carpenter's square according to claim 10, wherein the space receives at least a portion of the adjustable device.

12. The carpenter's square according to claim 11, wherein the space receives at least a portion of the blade.

13. The carpenter's square according to claim 1, wherein the first contacting element has a first anchoring structure non-rotatably mounted to the blade.

14. The carpenter's square according to claim 13, wherein the first anchoring structure includes a plurality of protrusions that engage with complementary shaped holes in the blade.

15. The carpenter's square according to claim 1, wherein the second contacting element has a second anchoring structure non-rotatably mounted to the handle.

16. The carpenter's square according to claim 15, wherein the second anchoring structure includes a plate received with a recess formed in the handle.

17. The carpenter's square according to claim 15, wherein the second anchoring structure includes a plate with a plurality of grooves that interlock with a plurality of protrusions formed in the handle.

18. Snap locking angle adjustable device, comprising:
   a first pivot member and a second pivot member, rotatable relative to each other around a pivot axis;
   a first contacting element having a first alignment structure that rotates rigidly with the first pivot member around the pivot axis;
   a second contacting element having complementary first alignment structure that rotates rigidly with the second pivot member around the pivot axis;
   a spring that, in conjunction with a spring expansion-restricting device, presses the first alignment structure axially against the complementary first alignment structure;
   a third contacting element having a third alignment structure that rotates rigidly with the first pivot member around the pivot axis; and
   a fourth contacting element having a complementary third alignment structure that rotates rigidly with the second pivot member around the pivot axis, wherein:
   the first alignment structure and the complementary first alignment structure align at certain angles between the pivot members, at which the spring force is reduced compared to at angles where they do not align,
   the spring expansion-restricting device comprises position-limiting members, in between which the spring and the contacting elements are placed, rigidly held together by connecting structure,
   the second pivot member and the second contacting element are separate components joined to each other by structure that rigidly connects these components with respect to rotations around the pivot axis,
   the spring, in conjunction with the spring expansion-restricting device, presses the third alignment structure axially against the complementary third alignment structure, and
   the third alignment structure and the complementary third alignment structure align at certain angles between the pivot members, at which the spring force is reduced compared to at angles where they do not align.

19. The snap locking angle adjustable device according to claim 18, wherein the distance between the position-limiting members can be changed by an axial screw coupling of the connecting structure, allowing for adjustment of the spring force.

20. The snap locking angle adjustable device according to claim 18, wherein the first and second contacting elements are provided with a sleeve and a sleeve groove assembly that aligns and secures the first and second contacting elements and the pivot members on the pivot axis.

21. A carpenter's square including the snap angle adjustable device according to claim 18.

22. A miter saw including the snap angle adjustable device according to claim 18.

23. A carpenter's square comprising:
   a blade and a handle, rotatable relative to each other around a pivot axis; and
   a snap locking angle adjustable device including:
      a first contacting element having a first alignment structure that rotates rigidly with the blade around the pivot axis, the first contacting element being positioned between the blade and the handle;
      a second contacting element having complementary first alignment structure that rotates rigidly with the handle around the pivot axis; and a spring that, in conjunction with a spring expansion-restricting device, presses the first alignment structure axially against the complementary first alignment structure; wherein:

the first alignment structure and the complementary first alignment structure align at certain angles between the pivot members, at which the spring force is reduced compared to at angles where they do not align;

the spring expansion-restricting device comprises position-limiting members, in between which the spring and the contacting elements are placed, rigidly held together by connecting structure, each one of the contacting elements with its alignment structure is a single unit formed by a moulding technique, the first pivot member and the first contacting element are separate components joined to each other by structure that rigidly connects these components with respect to rotations around the pivot axis, and the second pivot member and the second contacting element are separate components joined to each other by structure that rigidly connects these components with respect to rotations around the pivot axis.

24. A carpenter's square comprising:

a blade and a handle, rotatable relative to each other around a pivot axis; and a snap locking angle adjustable device including:

a first molded contacting element having a first alignment structure that rotates rigidly with the blade around the pivot axis;

a second molded contacting element having complementary first alignment structure that rotates rigidly with the handle around the pivot axis; and a spring to bias the first alignment structure axially against the complementary first alignment structure; wherein:

the first alignment structure and the complementary first alignment structure align at 22.5° or 45° intervals when the blade and the handle pivot between 0°–180°, at which 22.5° or 45° intervals the spring force is reduced compared to at angles where they do not align.

25. The carpenter's square according to claim 24, wherein the spring is positioned between the blade and the handle.

26. The carpenter's square according to claim 24, further comprising a spring expansion-restriction device to sandwich the blade, handle, and first and second contacting elements.

27. The carpenter's square according to claim 24, further comprising third and fourth molded contacting elements positioned between the first and second contacting elements.

28. The carpenter's square according to claim 24, wherein the handle has an upper face and a lower face defining a space therebetween.

29. The carpenter's square according to claim 28, wherein the space receives at least a portion of the adjustable device.

30. The carpenter's square according to claim 29, wherein the space receives at least a portion of the blade.

31. The carpenter's square according to claim 24, wherein the first contacting element has a first anchoring structure non-rotatably mounted to the blade.

32. The carpenter's square according to claim 31, wherein the first anchoring structure includes a plurality of protrusions that engage with complementary shaped holes in the blade.

33. The carpenter's square according to claim 24, wherein the second contacting element has a second anchoring structure non-rotatably mounted to the handle.

34. The carpenter's square according to claim 33, wherein the second anchoring structure includes a plate received with a recess formed in the handle.

35. The carpenter's square according to claim 33, wherein the second anchoring structure includes a plate with a plurality of grooves that interlock with a plurality of protrusions formed in the handle.

36. A carpenter's square comprising:

a blade and a handle, rotatable relative to each other around a pivot axis; and a snap locking angle adjustable device including:

a first contacting element having a first alignment structure that rotates rigidly with the blade around the pivot axis;

a second contacting element having complementary first alignment structure that rotates rigidly with the handle around the pivot axis; and a spring positioned between the blade and the handle, the spring pressing the first alignment structure axially against the complementary first alignment structure; wherein:

the first alignment structure and the complementary first alignment structure align at certain angles between the pivot members, at which the spring force is reduced compared to at angles where they do not align.

37. The carpenter's square according to claim 36, wherein each one of the first and second contacting elements with its alignment structure comprises a single molded unit.

38. The carpenter's square according to claim 36, wherein the first contacting element is positioned between the blade and the handle.

39. The carpenter's square according to claim 36, wherein each of the blade, the handle, the first and second contacting elements and the spring includes a through hole to receive a spring expansion-restricting device.

* * * * *